Figure 5:
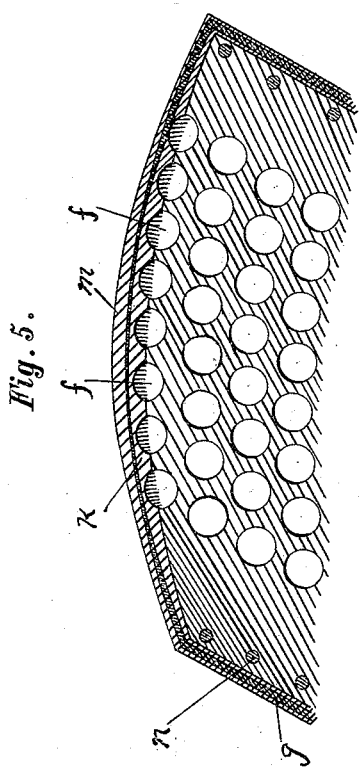

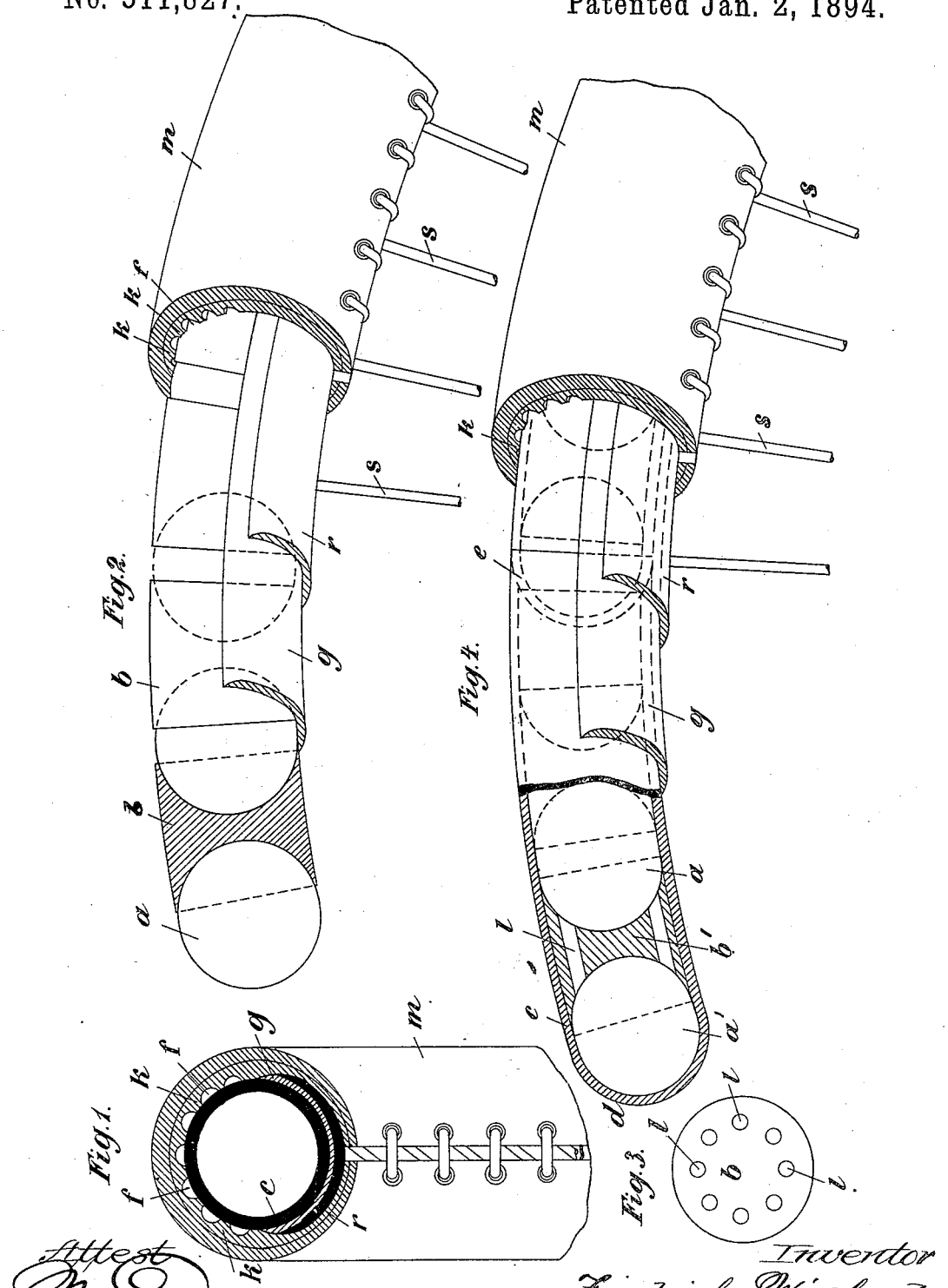

(No Model.) 2 Sheets—Sheet 2.
F. WIECHARD.
BICYCLE TIRE.

No. 511,827. Patented Jan. 2, 1894.

Attest
Walter Donaldson
F. L. Middleton

Inventor
Friedrich Wiechard
by Ellis Spear
Atty

UNITED STATES PATENT OFFICE.

FRIEDRICH WIECHARD, OF CASSEL, GERMANY.

BICYCLE-TIRE.

SPECIFICATION forming part of Letters Patent No. 511,827, dated January 2, 1894.

Application filed August 4, 1893. Serial No. 482,389. (No model.)

*To all whom it may concern:*

Be it known that I, FRIEDRICH WIECHARD, of 1 and 2 Wolfhager-strasse, Cassel, in the Kingdom of Prussia, in the Empire of Germany, have invented new and useful Improvements in Bicycles, of which the following is a specification, reference being had therein to the accompanying drawings.

This invention has for its object to provide an efficient and durable substitute for the so-called pneumatic tires for velocipede wheels which up to the present have proved unreliable because it is impossible to manufacture rubber tubes with thin walls which shall permanently resist the pressure of compressed air without mentioning the drawbacks occasioned by riding over sharp or pointed objects and which cause leakage or bursting of the pneumatic tire. These drawbacks are obviated by the use of a velocipede wheel tire which consists of an external covering of rubber and of hollow bodies which are embedded in said covering and while capable of supporting the weight required are at the same time elastic.

In the accompanying drawings:—Figure 1 is an elevation of the felly showing the lacing of the outer rubber casing with a radial section through the whole tire. Fig. 2 is a longitudinal elevation partly in section of the tire in which the inner tire is composed of celluloid balls and rubber packing pieces. Fig. 3 is a cross section of the rubber packing pieces of the inner tire. Fig. 4 is a longitudinal elevation with a section through the celluloid tube and the rubber packing pieces inserted therein. Fig. 5 is an elevation and section of the outer rubber casing.

A velocipede wheel tire constructed according to this invention consists essentially of the outer rubber casing and the inner tire. The inner tire is either composed of celluloid balls and rubber packing pieces or celluloid tubes with inserted rubber packing pieces. If the inner tire consists of celluloid tubes and rubber packing pieces, then the rubber packing pieces $b'$ are inserted into the celluloid tubes $c$ in such a manner as to form hollow spaces $a'$ therein of round or elongated oval shape. The celluloid tubes $c$ are bent according to the periphery of the velocipede wheel and to the pitch or number of the same and are closed at one end $d$ in the form of a hemisphere.

Two or three rubber packing pieces $b'$ may be inserted in each celluloid tube $c$. To close the open end of a tube a rubber packing piece $b'$ is inserted in such a manner that the hemispherical recess on one side of the same serves as a bearing and packing piece $e$ for the hemispherical closed end of the next following celluloid tube.

Next to the wheel rim or felly $r$ there is laid a thin rubber strip $g$ having a canvas core. This has the object of preventing injury to the celluloid parts of the inner tire through any spokes $s$ that may have become loose.

The rubber casing $m$ is rendered strong and durable or lasting by means of a strip of canvas made thicker at both sides. By this means and also by the insertion of brass eyelets the lacing holes $n$ are prevented from tearing open.

Rubber cushions K are cast on the inner surface of the rubber casing $m$. These consist of dome-shaped recesses of round, oval or angular form arranged alternately next to one another so that their walls constitute the adjacent recess $f$. This arrangement has for its object of imparting to the rubber casing $m$ the crisp resiliency or springiness which is peculiar to a pneumatic velocipede wheel tire. This enables the pneumatic wheel to glide over small obstacles such as freshly laid road ballast, &c. The rubber casing surrounds the parts of the inner tire and is laced together tightly on the inside of the felly of the velocipede wheel which (the felly) it also incloses. The present invention provides by this means a velocipede wheel tire which is not inferior to the pneumatic tire as regards lightness and elasticity while it obviates all drawbacks such as cementing, gluing or pasting or sticking, &c., which are inherent more or less to all existing velocipede wheel tires up to the present, while it also has the important advantage that every damaged part of the tire can be easily repaired or replaced at small cost.

What I claim, and desire to secure by Letters Patent of the United States, is—

1. In a wheel tire an outer covering $m$ and an inner lining having its inner face formed with a series of recesses and projections forming cushions, substantially as described.

2. A wheel tire comprising an outer covering, and a series of interior cylindrical packing pieces having hemispherically recessed ends, substantially as described.

3. A wheel tire comprising an outer covering, a series of interior cylindrical packing pieces having hemispherically recessed ends, and balls fitting within the recessed ends of adjacent packing pieces, substantially as described.

In witness whereof I have hereunto set my hand in presence of two witnesses.

FRIEDRICH WIECHARD.

Witnesses:
PAUL FISCHER,
JOHN B. JACKSON.